Sept. 7, 1965    D. EMERSON, JR., ETAL    3,204,668
PIPE INSULATION
Filed Aug. 28, 1961

INVENTORS.
Dean Emerson, Jr.
Kenneth Eugene Kurtz
BY J. Vincent Martin
Joe E. Edwards
M.H. Gay

United States Patent Office 3,204,668
Patented Sept. 7, 1965

3,204,668
PIPE INSULATION
Dean Emerson, Jr., and Kenneth Eugene Kurtz, both of Houston, Tex., assignors to MMM, Inc., Houston, Tex., a corporation of Texas
Filed Aug. 28, 1961, Ser. No. 134,393
3 Claims. (Cl. 138—158)

This invention relates to insulation, and more particularly to pipe insulation.

An object of this invention is to provide expanded plastic pipe insulation in which a complete vapor seal is provided by the expanded plastic material.

Another object is to provide an end seal for adjacent blocks of pipe insulation by a spline between the blocks.

Another object is to provide split sections of expanded plastic pipe insulation with a hinge to permit is ready installation about a pipe.

Another object is to provide split sections of expanded plastic pipe insulation with a hinge to permit its ready installation about a pipe in which the hinge also provides a vapor barrier closing the split section on one side of the pipe.

Other objects, features and advantages of the invention will be apparent from the specification, the drawings and the claims.

In the drawings, wherein illustrative embodiments of this invention are shown, and wherein like reference numerals indicate like parts;

Reference is first made to FIGURES 1–4 in which the preferred form of this invention is shown. The pipe 10 which is to be insulated has positioned therealong a plurality of insulating blocks 11 and 12. These blocks are formed from cellular plastic material of the type in which the cells are not interconnected. Preferably, the blocks are made from expanded polystyrene. They may also be fabricated from polyurethane but polystyrene is preferred in many cases because polyurethane does not form a complete vapor barrier. Where polyurethane insulation blocks are used, they will normally have a sealer coating of some material about the outer surface of the insulating block. For instance, a coating of polyvinyl acetate might be used. While the blocks may have any exterior configuration, they are preferably cylindrical in form.

Figure 1:
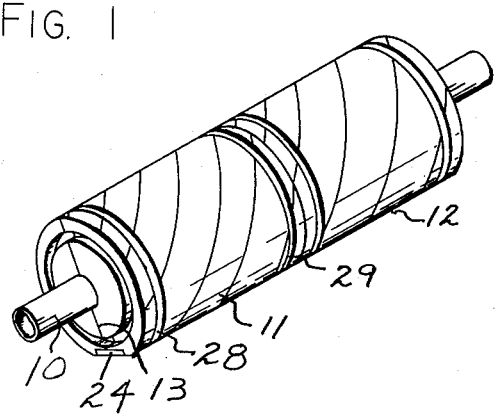
FIGURE 1 is a diagrammatic view of pipe insulation constructed in accordance with this invention and shown in position about a pipe.

In order to insert the insulation material about a run of pipe, it is split at 13 into the longitudinal sections indicated generally at 14 and 15. In the conventional manner the two split sections may be placed around a pipe as shown in FIGURE 1.

In order to accommodate the pipe within the insulation blocks, the blocks preferably have grooves 16 and 17 formed therein along the central longitudinal axis of the insulation blocks to receive the pipe 10. These grooves open into the split 13 to permit them to receive the pipe to be insulated.

Means are provided for providing a vapor barrier across the split 13. This vapor barrier means may include one or more longitudinal splineways such as 18 and 19 in insulation sections 14 and 15, respectively. A longitudinal spline 21 cooperates with the longitudinal splineway to provide a vapor barrier across the split.

A longitudinal spline 21 is formed from expanded cellular plastic material of a type in which the cells are not interconnected. In the preferred form the spline is preferably formed from expanded polystyrene. It might also be formed from expanded polyethylene, but polystyrene is preferred as it is less expensive than polyethylene. When the insulation block is formed from polyurethane the spline may also be fabricated from polyurethane. It might be noted that the splineways and splines are sawed, thus exposing many edges of the small individual cells of the insulation material. The spline fits snugly in the splineways and the contact of these many surfaces provides a vapor barrier preventing flow of vapor through the split 13.

Figures 2A, 2B:
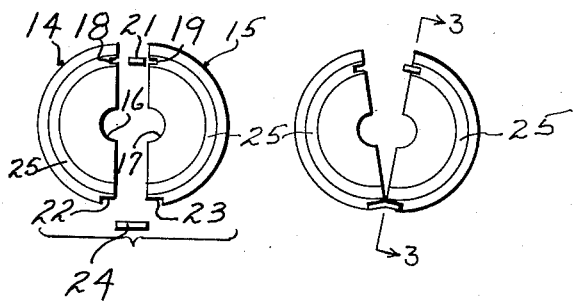
FIGURE 2A is an exploded end view of the insulation of FIGURE 1.
FIGURE 2B is a view similar to FIGURE 2A showing the hinge material in place and the spline in place in one section of an insulation block with the entire assembly ready to be moved about a pipe to be insulated.

In the preferred form a notch is formed in the insulation block across the split 13 and at the surface of the insulation block. This notch is best seen in FIGURE 2A and is provided by longitudinally extending cutout sections 22 and 23 in insulation sections 14 and 15, respectively.

A vapor barrier is provided on the notched side of grooves 16 and 17 by a strip of expanded polyethylene 24 which extends the length of the insulation block, and is secured to the two insulation sections by a suitable adhesive. As the strip 24 traverses the split 13 and is made of a material of the type in which the cells are not interconnected, the strip 24 will provide a vapor barrier. Polyethylene being flexible, the strip will also provide a hinge between the two sections of insulation material as demonstrated in FIGURE 2B. Polyethylene is highly compressible and has a very high recovery. Thus, when the two sections are spread apart as shown in FIGURE 2B, the radially outermost material of the strip 24 will compress, permitting the strip to function as a hinge. Then, when the two sections are brought together about a pipe, as shown in FIGURE 1, the strip 24 will recover to substantially its original dimensions.

While the invention as thus far described may be used without utilizing the remainder of this invention, it is preferred to form a vapor barrier between adjacent insulation blocks 11 and 12 along the pipe in accordance with this invention.

Figure 4:
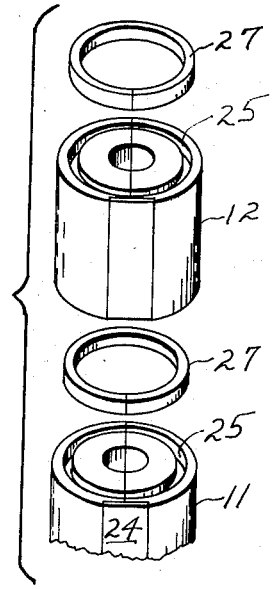
FIGURE 4 is a schematic exploded view of the insulation of FIGURE 1.
Figure 3:
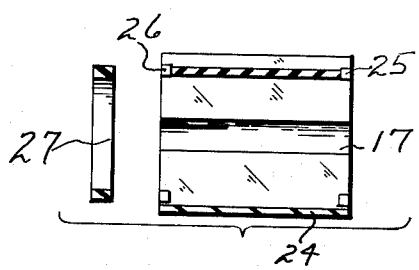
FIGURE 3 is a view along the lines 3—3 of FIGURE 2B and additionally showing an end spline in exploded position relative to the insulation block.

As best seen in FIGURES 3 and 4, each end of insulation blocks 11 and 12 has an annular splineway 25 and an annular splineway 26 therein. These splineways surround the pipe-receiving groove provided by the semicircular grooves 16 and 17. As will be noted, the splineways also communicate with the longitudinal splineways 18 and 19.

An annular end spline 27 is provided for cooperation with confronting annular splineways 26 and 26 to provide a vapor barrier between the end faces of adjacent insulation blocks 11 and 12, and by engaging the end of longitudinal splines 21 to complete the vapor barrier of the insulation blocks. The end spline is made from expanded plastic materials in which the cells are not connected so as to provide a vapor barrier. The spline is also made from an expanded plastic which has substantial resiliency and recovery characteristics so that it can be forced into the annular end splineways 25 and 26 and into engagement with the longitudinal splines 21. Preferably the annular end splines are cut larger than the annular splineways so that they will be under compression at all times. It is further preferred that the annular end splines have a greater radial dimension than the radial dimentsion of the annular splineways so that the recovery characteristics of the annular end spline will not tend to urge the adjacent insulation blocks apart, even though they are maintained under compression.

Expanded cellular polyethylene has been found excellent for this service. A further advantage of the expanded polyethylene is that the splines 27 may be cut in flat, straight strips and curved into annular form at the time of installation of the insulation blocks, thus eliminating the possibility of breaking of more rigid material and the need for cutting more rigid material to close tolerances such as would be required if a material such as polystyrene were used.

After two sections of insulation material such as 14 and 15 are assembled, as shown in FIGURE 2B, they may be placed about a pipe and brought together to the position shown in FIGURE 1. The insulation may then be held in this position in any desired manner such as by bands 28 and 29 which may be metallic or plastic. A further known alternative is to encase the insulation blocks in a plastic covering which is closed with a zipper. After a section of material 11 has been placed about the pipe, an annular end spline 27 may be inserted in the annular splineway and a second adjacent insulation block 12 positioned about the pipe and brought into abutment with insulation block 11. As the two insulation blocks are pushed together, the end splineway of block 12 will receive the projecting portion of the end spline 27. Bands 28 and 29 may be applied as the successive sections of insulation are placed about a pipe, or several sections of insulation may be placed about a pipe and then banded.

Figure 5:
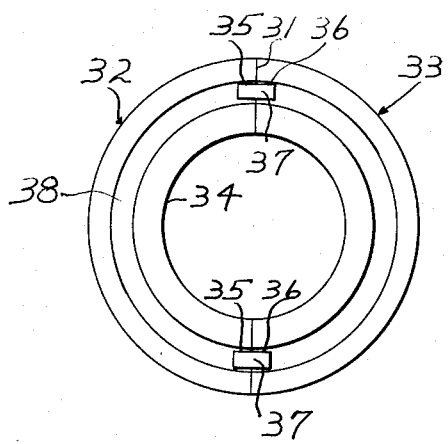
FIGURE 5 is an end view of a modified form of this invention.

Reference is now made to FIGURE 5 in which a modified form of this invention is shown. The insulation block shown in FIGURE 5 may be fabricated from expanded polystyrene. Preferably the block is cylindrical in form and is split at 31 to provide two sections indicated generally at 32 and 33. A groove 34 is provided in the insulation block opening to the split 31 to receive a pipe to be insulated.

A vapor barrier is provided in the split 31 on opposite sides of the pipe-receiving groove 34 by confronting splineways 35 and 36 in the insulation sections 32 and 33, respectively. These splineways are identical and open into the split on opposite sides of the pipe-receiving groove 34.

A vapor barrier is provided in the split 31 on opposite sides of the groove 34 by identical splines 37 in the two splineways. These longitudinal splines may be fabricated from expanded polystyrene or expanded polyethylene. Either of these materials provides an expanded plastic in which the cells are not connected with each other to provide a vapor barrier. Polystyrene is preferred as it is more economical.

The end faces of the insulating block of FIGURE 5 are provided with annular splineways 38. An annular spline 27, such as shown in FIGURE 3, cooperates with the splineways 38 in the manner hereinabove explained in connection with the other embodiment to engage the longitudinal splines 37 and provide a vapor barrier between adjacent insulating blocks such as shown in FIGURE 5.

From the above it will be apparent that when a material which provides a vapor barrier is desired, either form of the invention will be fabricated in its entirety from polystyrene with the exception of the annular end splines and the hinge 24 when used. When the insulation material is so fabricated, a complete vapor barrier will be obtained with either form of the invention. The hinge provided by strip 24 will be useful when the insulation material is polyurethane as it will assist in readily positioning the insulation about the pipe. The form of the invention shown in FIGURE 5 might be fabricated from polyurethane with polyethylene end splines, but in this case the end splines would only serve as a spline connection between adjacent blocks of insulation material, as a sealer coating would normally be applied over the exteior of the insulation material.

From the above it will be seen that the objects of this invention have been attained. In one form of the invention there is provided an assembly of insulation material in which a complete vapor barrier is provided by the insulation block and its associate splines. In another form of the invention a hinge structure is provided which may or may not be used with insulation blocks and associated splines of the type which provide a complete vapor barrier.

The foregoing disclosure and discription of the invention is illustrative and explanatory thereof and various changes in the size, shape and materials, as well as in the details of the illustrated construction, may be made within the spirit of the invention.

What we claim is:

1. Pipe insulation comprising, a plurality of elongate insulation blocks formed from expanded polystryrene, said blocks split longitudinally and having grooves opening into the split for receiving pipe to be insulated, means forming a vapor barrier across said split including a longitudinal splineway in said blocks opening into said split and a longitudinal spline in said longitudinal splineway, said spline formed from expanded cellular plastic material of the type in which the cells are not interconnected, annular splineways in the end faces of each insulation block and surrounding said groove, end splines in said annular splineways engaging the longitudinal splines and forming a vapor barrier between adjacent insulation blocks, said end splines formed from expanded polyethylene, and means wrapped around said insulation blocks and securing said split sections of insulation block together.

2. Pipe insulation comprising, a plurality of elongate insulation blocks formed from expanded plastic material of the type in which the cells are not interconnected, a longitudinally extending notch cut in the outer surface of each block, each block split longitudinally into two sections along said notch, a strip of expanded polyethylene extending along the notch in each block, an adhesive securing the strip of polyethylene to each section of a block to provide a vapor barrier and a hinge between the split sections, a groove in each block opening into the split for receiving pipe to be insulated, a longitudinal splineway in each block opening into said split on the side of the groove opposite said notch, a longitudinal spline in said longitudinal splineway, said spline formed from expanded cellular plastic material of the type in which the cells are not interconnected, and means wrapped around said insulation blocks and securing said split sections of insulation blocks together.

3. Pipe insulation comprising, a plurality of elongate insulation blocks formed from expanded plastic material of the type in which the cells are not interconnected, a longitudinally extending notch cut in the outer surface of each block, said blocks split longitudinally into two sections along said notch, a strip of expanded polyethylene extending along the notch in each block, an adhesive securing the strip of polyethylene to each section of a block to provide a vapor barrier and a hinge between the split sections, a groove in each block opening into the split for receiving pipe to be insulated, a longitudinal splineway in each block opening into said split on the side of the groove opposite said notch, a longitudinal spline in said longitudinal splineway, said spline formed from expanded cellular plastic material of the type in which the cells are not interconnected, annular splineways in the end faces of each insulation block and surrounding said groove, end splines in said annular splineways engaging the longitudinal splines and forming a vapor barrier between adjacent insulation blocks, said end splines formed from expanded polyethylene, and means wrapped around said insulation blocks and securing said split sections of insulation blocks together.

(References on following page)

References Cited by the Examiner

UNITED STATES PATENTS

| | | | |
|---|---|---|---|
| 273,687 | 3/83 | Kelly | 138—149 |
| 312,037 | 2/85 | Suhr | 138—149 |
| 507,145 | 10/93 | Macan | 154—44 |
| 1,105,844 | 8/14 | Schaperjahn | 154—44 |
| 1,510,838 | 10/24 | Frazier | 285—419 |
| 2,717,848 | 9/55 | Jaye | 154—44 |
| 2,727,286 | 12/55 | Moore | 20—92 |
| 2,756,172 | 7/56 | Kidd | 154—44 |
| 3,058,860 | 10/62 | Rutter | 138—147 |
| 3,126,035 | 3/64 | Espetvedt | 138—162 |

ALEXANDER WYMAN, *Primary Examiner.*

EARL M. BERGERT, HAROLD ANSHER, *Examiners.*